United States Patent
Rigazio et al.

(10) Patent No.: US 8,502,787 B2
(45) Date of Patent: Aug. 6, 2013

(54) SYSTEM AND METHOD FOR DIFFERENTIATING BETWEEN INTENDED AND UNINTENDED USER INPUT ON A TOUCHPAD

(75) Inventors: Luca Rigazio, San Jose, CA (US); David Kryze, Campbell, CA (US); Philippe Morin, Goleta, CA (US); Tiffany Yun, Freemont, CA (US)

(73) Assignee: Panasonic Corporation, Osaka (JP)

( * ) Notice: Subject to any disclaimer, the term of this patent is extended or adjusted under 35 U.S.C. 154(b) by 1044 days.

(21) Appl. No.: 12/508,704

(22) Filed: Jul. 24, 2009

(65) Prior Publication Data
US 2010/0127995 A1    May 27, 2010

Related U.S. Application Data

(60) Provisional application No. 61/118,172, filed on Nov. 26, 2008.

(51) Int. Cl.
*G06F 3/041* (2006.01)
*G06F 3/048* (2006.01)

(52) U.S. Cl.
USPC ........... 345/173; 715/764; 715/773; 715/858; 345/169

(58) Field of Classification Search
USPC ................. 345/156–157, 168–169, 172–175, 345/179; 715/700, 764–773, 856–858
See application file for complete search history.

(56) References Cited

U.S. PATENT DOCUMENTS

| | | | |
|---|---|---|---|
| 5,453,758 A | 9/1995 | Sato | |
| 5,459,489 A | 10/1995 | Redford | |
| 5,774,571 A | 6/1998 | Marshall | |
| 5,856,824 A * | 1/1999 | Shieh | 345/173 |
| 6,429,543 B1 | 8/2002 | Desai | |
| 6,456,275 B1 | 9/2002 | Hinckley et al. | |
| 6,501,515 B1 | 12/2002 | Iwamura | |
| 6,822,635 B2 | 11/2004 | Shahoian et al. | |
| 6,831,664 B2 | 12/2004 | Marmaropoulos et al. | |
| 7,004,394 B2 | 2/2006 | Kim | |
| 7,133,031 B2 | 11/2006 | Wang et al. | |
| 2003/0156756 A1* | 8/2003 | Gokturk et al. | 382/190 |
| 2003/0179246 A1 | 9/2003 | Marmaropoulos et al. | |
| 2004/0236699 A1 | 11/2004 | Beenau et al. | |
| 2006/0016868 A1 | 1/2006 | Bonalle et al. | |
| 2006/0197750 A1* | 9/2006 | Kerr et al. | 345/173 |
| 2008/0088602 A1* | 4/2008 | Hotelling | 345/173 |

* cited by examiner

*Primary Examiner* — Lun-Yi Lao
*Assistant Examiner* — Jarurat Suteerawongsa
(74) *Attorney, Agent, or Firm* — Harness, Dickey & Pierce, P.L.C.

(57) ABSTRACT

A method and system for differentiating between intended user input and inadvertent or incidental contact with a touchpad is herein disclosed. When a user engages the touchpad, sensors on the touchpad are activated and generate touch sensor signals. Based on the pattern of engaged sensors, a hand pattern can be determined. From the hand pattern, a hand model may be retrieved. The hand model may indicate passive zones and active zones. Contact in the active zones may be considered intentional, while contact in the passive zones may be considered unintended or incidental. Moreover, a global shift may be calculated, and input from the active zones may be compensated for the global shift. The input from the active zones can then be used to control a graphical user interface.

31 Claims, 12 Drawing Sheets

SYSTEM AND METHOD FOR DIFFERENTIATING BETWEEN INTENDED AND UNINTENDED USER INPUT ON A TOUCHPAD

CROSS-REFERENCE TO RELATED APPLICATIONS

This application claims the benefit of U.S. Provisional Application No. 61/118,172, filed on Nov. 26, 2008. The entire disclosure of the above application is incorporated herein by reference.

FIELD

The present disclosure relates to a method and system for compensating for passive movements on a touch sensitive input device and differentiating between intended and unintended user input on a touch sensitive input device.

BACKGROUND

Touch based interfaces are becoming extremely commonplace in today's handheld devices. It is envisioned that such touch-based interfaces will enter into the home appliance and furniture market, in the form of intelligent furniture and appliances. As touch based interfaces become more powerful, a greater amount of user input will be supported. Accordingly, the physical amount of space on a touch screen is a limiting factor into the amount of input the touch interface can receive from a user.

In the case of a handheld device, the back surface of the device is commonly left unused, and as such may be an important and unexploited area of interaction. In the case of furniture such as a tabletop, the table top provides a large surface that remains unexploited. In either case, these unexploited surfaces will draw up new challenges to developers because a touch interface needs to be resilient to user intentions, that is—the interface must be able to distinguish between voluntary user input and inadvertent or passive interactions with the touch interface. In the case of a handheld device, a user's palm will frequently be touching the back of the device, while on a table top, it is often more comfortable for a user to rest the entire hand on a tabletop, rather than just the user's fingers.

This section provides background information related to the present disclosure which is not necessarily prior art.

SUMMARY

This section provides a general summary of the disclosure, and is not a comprehensive disclosure of its full scope or all of its features.

In one aspect, a method for distinguishing intended user input from unintended user interaction with a touchpad is disclosed. Said method comprising receiving a touch sensor signal from the touchpad indicating points of contact between sensors of the touchpad and a user, wherein a point of contact is a location of a sensor on the touchpad that is in contact with the user. The method further includes identifying points of contact corresponding to at least one of the user's finger and points of contact corresponding to at least one of a user's thumb and a user's palm based on the touch sensor signal and a model of a hand. The method further includes identifying intended user input from the touch sensor signal wherein the intended user input corresponds to a portion of the touch sensor signal originating from the points of contact corresponding to a user's finger.

In a second aspect, a method for controlling a user interface using a touchpad is disclosed. The method comprises receiving a touch sensor signal from the touchpad indicating points of contact between sensors of the touchpad and a user, wherein a point of contact is a location of a sensor on the touchpad that is in contact with the user and estimating a user hand pattern indicating an orientation of the user's hand with respect to the touchpad based on the touch sensor signals. The method further includes retrieving a hand model from a hand model database based on the user hand pattern, wherein the hand model indicates active spatial locations relative to the touchpad where the user's hand motions are classified as intended motions and passive spatial locations relative to the touchpad where the user's hand motions are classified as inadvertent contact. The method further comprises calculating a global indicating movement of a majority of the user's hand relative to the touchpad, adjusting touch sensor signals corresponding to the active spatial locations based on the calculated global shift, and controlling a user interface based on adjusted touch sensor signals.

In a third respect, a method for controlling a user interface using a touchpad is disclosed, the method comprising receiving touch sensor signals from a touchpad, wherein a touch sensor signal includes a plurality of contact points between a user's hand and the touchpad and estimating a user hand pattern that indicates an orientation of the user's hand with respect to the touchpad based on the touch sensor signals. The method further includes retrieving a hand model from a hand model database based on the user hand pattern, wherein the hand model indicates active spatial locations relative to the touchpad where the user's hand motions are classified as intended motions and passive spatial locations relative to the touchpad where the user's hand motions are classified as inadvertent. The method further comprises controlling a graphical user interface based on touch sensor signals received from sensors in the active spatial locations of the touchpad.

In a fourth aspect, a device having a graphical user interface is disclosed, the device comprising a front surface and a rear surface, wherein a display unit resides on the front surface of the device and a touchpad resides on the rear surface of the device. The touchpad having sensors dispersed along an outer surface of the touchpad, wherein the sensors are sensitive to a user's touch, and wherein the touchpad generates a touch sensor signal indicating locations of points of contact between the user's hand and the touchpad. The device further includes a signal processing module that receives the touch sensor signal and determines a user hand pattern based on the touch sensor signal and a model of a hand, wherein a hand pattern includes points of contact of the user's fingers and points of contact of at least one of the user's palm and the user's thumb. The signal processing module identifies intended user input from the touch sensor signal, wherein the intended user input corresponds to a portion of the touch sensor signal originating from the points of contact corresponding to a user's finger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
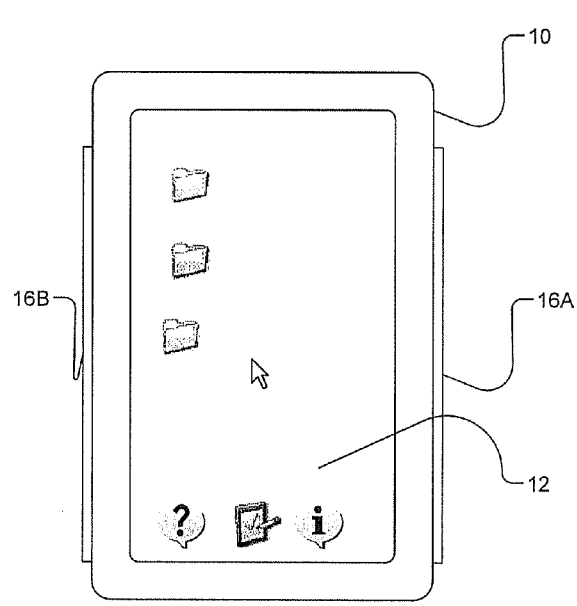
FIGS. 1A-1D illustrate various views of a user device with a touch sensitive surface.

FIGS. 1A-1D depict exemplary handheld device 10. FIG. 1A depicts a frontal view of the exemplary device 10. On the front surface, a display unit 12 is disposed along the majority of the front surface. The display 12 may be a dedicated display unit, such as an OLED or LCD display. Alternatively, the display 12 may be a touch sensitive display unit, such as a resistive screen, a conductive screen or an acoustic screen. It is envisioned any type of touch-enabling technology may be implemented for a touch sensitive screen 10.

Figure 1B:
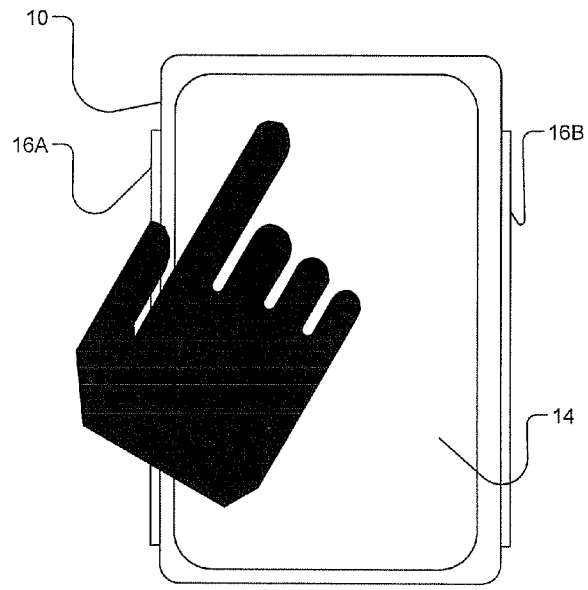

FIG. 1B depicts a rear view of the exemplary device 10. A touch-sensitive surface 14 may be disposed along a portion or all of the rear surface. The touch-sensitive surface 14 may be comprised any known touch sensitive sensors, such as a capacitive array.

Figure 1C:
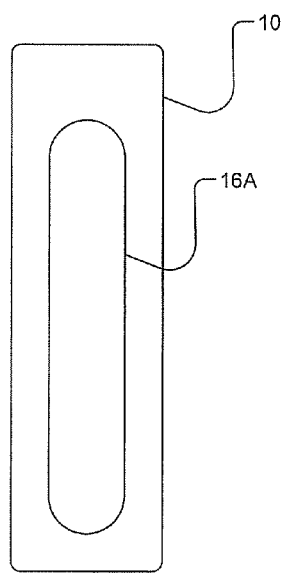
Figure 1D:
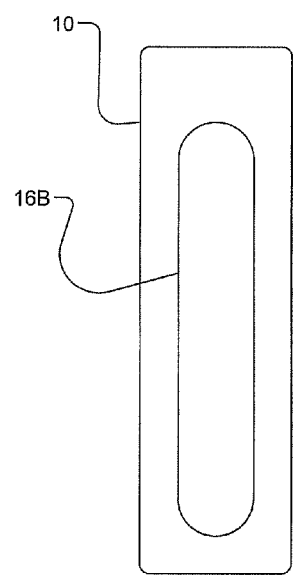

FIGS. 1C and 1D show the left and right surfaces of the device. On the sides, a clickable surface 16A and 16B may be dispersed along one or both of the sides of the device. The clickable surfaces 16A and 16B may also be touch sensitive. In alternative embodiments, the side input mechanisms 16A and 16B do not need to be clickable, but may be touch sensitive instead.

Figure 2:
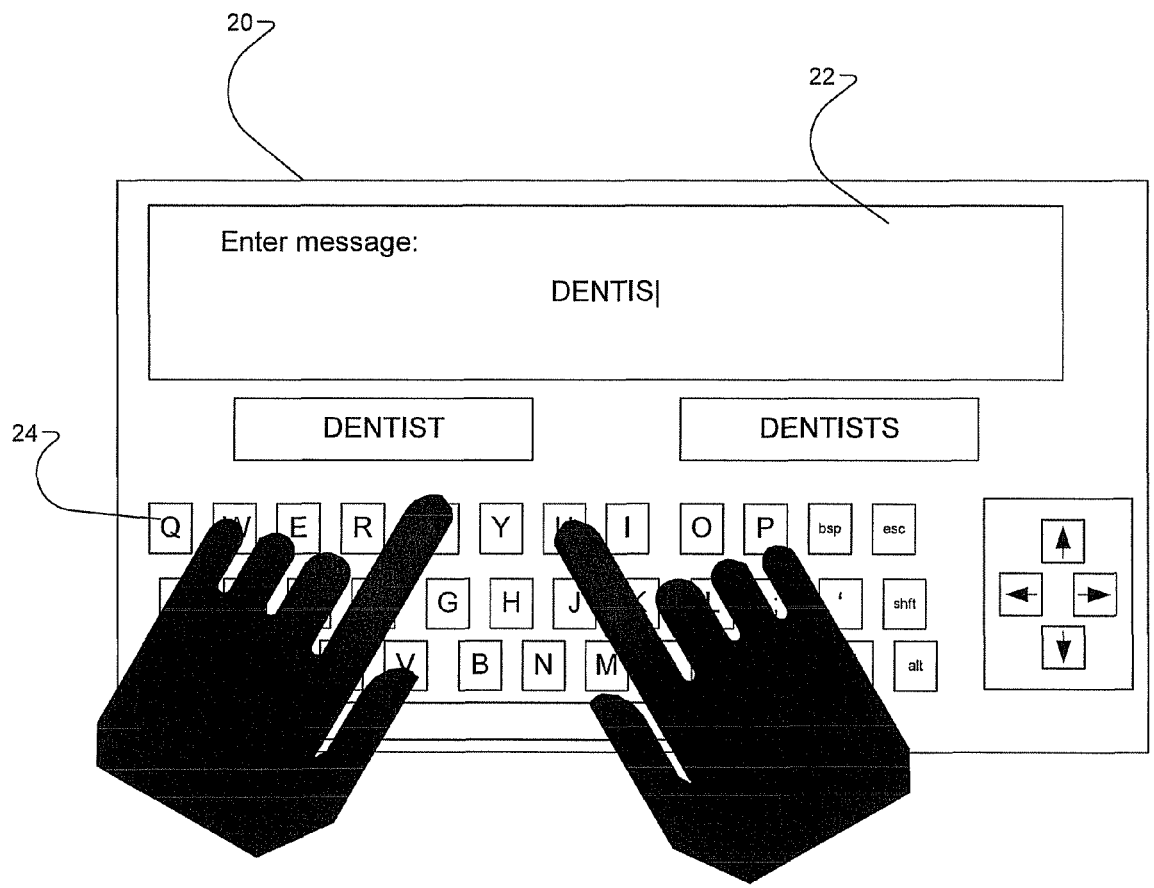
FIG. 2 illustrates a tabletop with a touch sensitive surface.

FIG. 2 depicts an exemplary touch-sensitive table top 20. The exemplary table top 20 may incorporate a touch-sensitive display 22. The touch sensitive display may be displaced along the surface of the table top 20. Similar to the handheld device described above, the touch sensitive portion of the screen may be any known type of touch sensitive display, such as a resistive screen, a conductive screen or an acoustic screen. In some embodiments, the touch sensitive tabletop may display virtual input interfaces such as a keyboard 24 or remote control (not shown) that the user may use to enter user input. In some embodiments, the tabletop may be a touch sensitive surface spatially separated from the display unit, wherein the user interface is displayed on the display unit and input is entered, at least in part, from the touch sensitive surface.

The foregoing devices are meant to provide an example of exemplary devices on which the disclosed methods may be used in connection with. It is envisioned that the exemplary methods may be used with any type of touch sensitive surface, now known or hereinafter developed.

Figure 3:
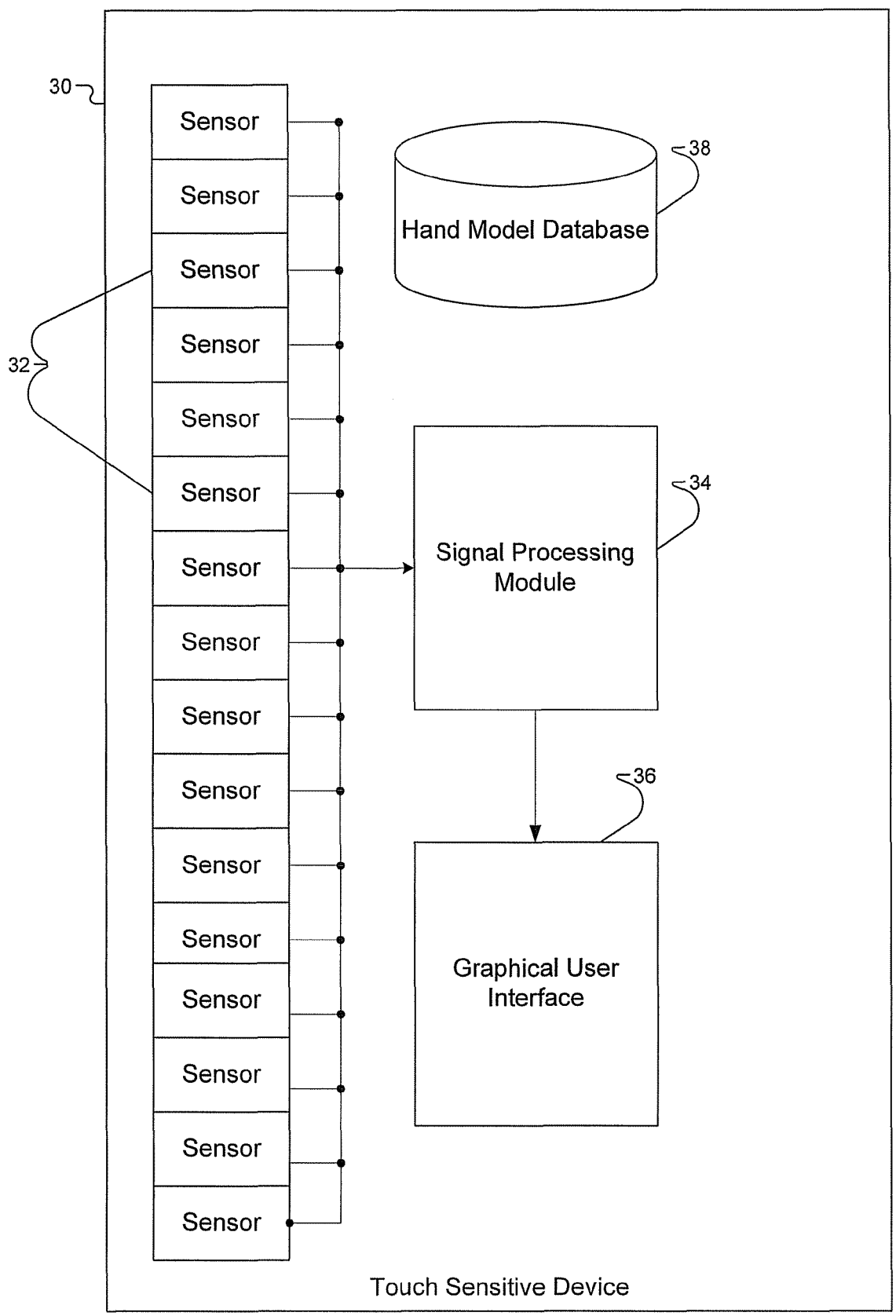
FIG. 3 illustrates a system level architecture of the touch sensitive input mechanism.

FIG. 3 depicts an exemplary architecture of a device having a touch sensitive surface. The device may include a plurality of touch-sensitive sensors 32, a signal processing module 34, and a graphical user interface 36. The plurality of sensors 32 are sensors that are responsive to a user's touch. The plurality of sensors are activated by a user's touch and generate a signal indicating the relative location of the user input with respect to the touch sensitive surface, i.e. the contact point, which is communicated to the signal processing module 34. The signal processing module 34 receives the signals from the plurality of sensors and determines a user input. The user input is communicated to the graphical user interface 36, or may be communicated to other components of the device.

The plurality of sensors 32 may be arranged in a grid like structure. It should be appreciated that in such a configuration, each sensor has a corresponding location relative to the other sensors. It is preferable to have a large amount of sensors, so that richer data sets may be realized. In an exemplary embodiment, the touch surface may have 256 independent contact points. This number is not required, however. Furthermore, a greater or lesser amount of sensors may be used on the touch sensitive surface. Thus, when a sensor is activated the signal generated by the sensor may communicate a coordinate of the activated sensor to the signal processing module 34.

The communication of a coordinate may be accomplished in a number of ways. For example, each sensor may generate a slightly different signal, wherein the signal processing module 34 can identify the sensor that generated the signal based on the generated signal. Alternatively, each sensor may be coupled to a corresponding pin that receives the signals on behalf of the signal processing module 34. Thus, signal processing module 34 can identify the source of the signal by the pin which receives the signal. It is envisioned that alternative means of determining the location of an activated sensor may be implemented.

As mentioned, signal processing module 34 may associate a coordinate with an activated sensor. The coordinates may be expressed in x,y coordinates, polar coordinates, or any other known representation of coordinates. Furthermore, in some embodiments the plurality of sensors 32 may be pressure sensitive as well. In these embodiments, additional information relating to the pressure applied may also be communicated so that a seemingly two dimensional input may be three-dimensional, as the pressure applied would add a dimension to the user input.

It is noted that that other pertinent data may be included in the touch sensor signal. One such data type may be capacitance at the various points. As can be appreciated, the capacitive sensors can output a value of the capacitance at each point of contact. Thus, for every sensor located at (x,y), a value $C(x,y)$ indicating a capacitance may be provided as well.

The exemplary architecture may further include a hand model database 38. The hand model database is used to determine a user hand pattern based on the touch sensor signals received from the touch sensitive surface. The models contained in hand model database may be preloaded by a manufacturers or may be learned through user training. In the former embodiment, the manufacturer may use any amount of different hand patterns to represent a closed universe of hand models. In this embodiment, the hand patterns may represent one hand size for all patterns or may include various hand sizes for each pattern. If the hand models are learned from the user, the user will need to enter the training data into the hand model database. The user may be prompted to do various tasks on the touchpad so that the hand model database will have enough hand models to match from. Various techniques for determining a hand model from the user's hand pattern are disclosed below.

In some embodiments, the exemplary architecture may also contain an accelerometer. The accelerometer may be used for determining movements of the device. When the device moves relative to the hand, signal processing module 36 may determine that the resulting touch sensor signals were the result of the device moving and, therefore, not user input. Greater detail on how the accelerometer data is used to correct the touch sensor signals is provided below.

As can be appreciated, in the touch sensitive devices described above, situations where the user is inadvertently in contact with the touch sensitive surface are highly likely. For example, if the handheld device is a PDA, cellular phone, or MP3 player, the user will likely hold the device, thereby pressing his or her palm along the rear touch sensitive surface of the device. Similarly, a user may place an object on the touch-sensitive tabletop and inadvertently touch the touch-sensitive display when grabbing the object resting on the tabletop. Accordingly, the signal processing module 34 of the present invention may be configured to execute a method for differentiating between voluntary intended user input and inadvertent or passive contact with the touch sensitive surface.

Figure 4:
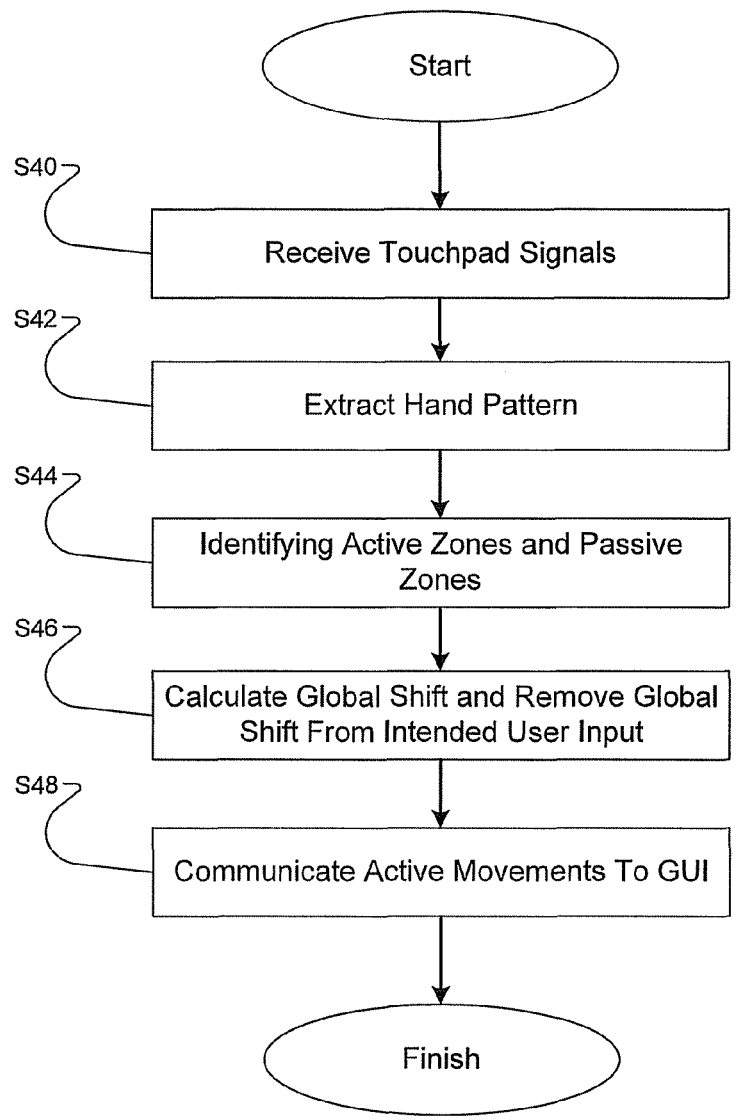
FIG. 4 illustrates a flow diagram of an exemplary method for processing touch input to control a user interface.

An exemplary method to differentiate intended touch input from inadvertent or unintended touch input is illustrated in FIG. 4. The method may generally include step S40 of receiving touch sensor signals from the touch sensitive surface. This step corresponds to a user activating the touch sensors on a touchpad. Next, the method may include step S42 where a hand pattern model may be determined from the received touch sensor signals. The touch sensor signals will indicate contact points between the user's hand and the touch sensitive surface, which may be used to extract a pattern of the user's hand. The method then proceeds to step S44, identifying active zones and passive zones on the touch sensitive surface based on the hand pattern model. The hand pattern models may include areas proximate to the contact points that are considered either active zones, i.e. zones where contact is considered intended input, or passive zones, i.e. zones where contact is considered inadvertent or incidental. Next, the method may include a step S46 of calculating a global shift of a user's hand and compensating the touch sensor signals originating from the active zones for the global shift. Global shift is observed when the entire hand moves in relation to the touchpad. Global shift may be the result of the user regripping the device, or the device slipping out of the user's hand. Thus, any input associated with the global shift may be disregarded, as it is typically unintended user input. Finally, the method includes step S48, communicating the corrected active touch input to a graphical user interface (GUI).

It is envisioned that the steps may be embodied as machine executable instructions stored on an electronic medium. Further the steps may be executed on a processor associated with the device. In some embodiments, special hardware components may perform some or all of the steps recited above and described below. Furthermore, a database storing hand models may be utilized. The database may be stored in an electronic memory associated with the user device.

The general steps are now described in greater detail. Step S40 is initiated upon a user touching the touch sensitive surface. As described above, there exist various types of touch sensors that may receive input. For purposes of explanation the touch sensors are described as capacitive sensors. The input from the capacitive sensors is received by the signal processing module 34 (FIG. 2).

Figure 5:
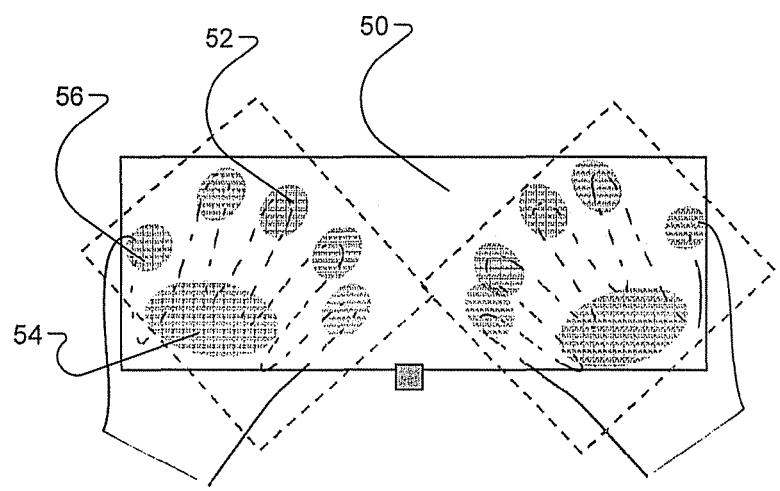
FIG. 5 illustrates an example of a user's hands interacting with a touch sensitive surface.

Signal processing module 34 receives the touch sensor signal from the touchpad surface. As described earlier, the received signal will indicate the locations of the triggered sensors at a given time, t. As can be appreciated, the points of contact between a user's hand and the capacitive sensors may resemble a series of blobs. FIG. 5 illustrates an example of the contact points between a user's hand and the touch sensors. As shown, there are blobs corresponding to the contact point between the user's fingers 52 and the touchpad 50, the user's palm 54 and the touchpad 50, and the user's thumb 56 and the touchpad 50. In an exemplary embodiment, signal processing module 34 may determine a sensor is activated if the capacitance associated with a particular sensor exceeds a predetermined threshold. Alternatively, signal processing module 34 may assume that any triggered sensor is in fact the result of a user's contact with the touch sensitive surface.

Figure 6:
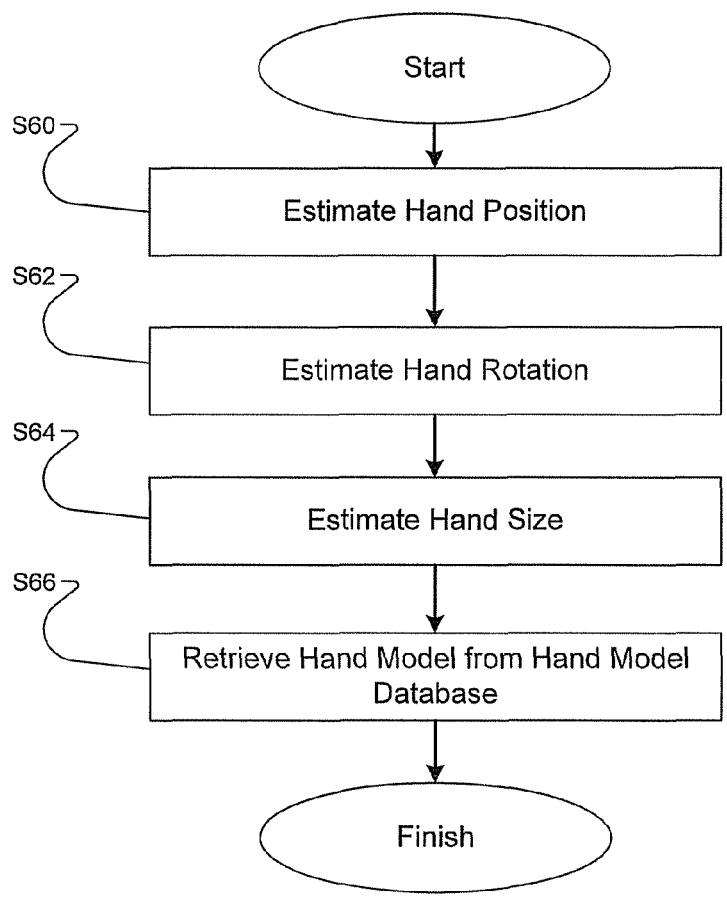
FIG. 6 illustrates a flow diagram of an exemplary method for determining a hand pattern of a user.

FIG. 6 illustrates an exemplary method for extracting a hand pattern from the touch sensor signals. At step S60, signal processing module 34 will estimate a hand position. The estimated hand position may be extracted from the touch sensor signal. As previously mentioned, signal processing module 34 may identify separate blobs as areas where the user is in contact with the touch sensitive surface. Signal processing module 34 may assume that a central larger blob corresponds to the palm, while smaller blobs around the central larger blob correspond to the fingers. Also, signal processing module 34 may differentiate between the thumb and the fingers by searching for a single small blob located closer to the blob associated with the palm or by searching for a series of two or more blobs located above or below the palm blob. In some embodiments, signal processing module 34 may remove statistical outliers from the touch sensor signal when it is determined that a triggered sensor does not belong to any of the blobs. By locating and classifying the various blobs, signal processing module 34 can determine the user's hand location with a high degree of certainty.

Figure 11:
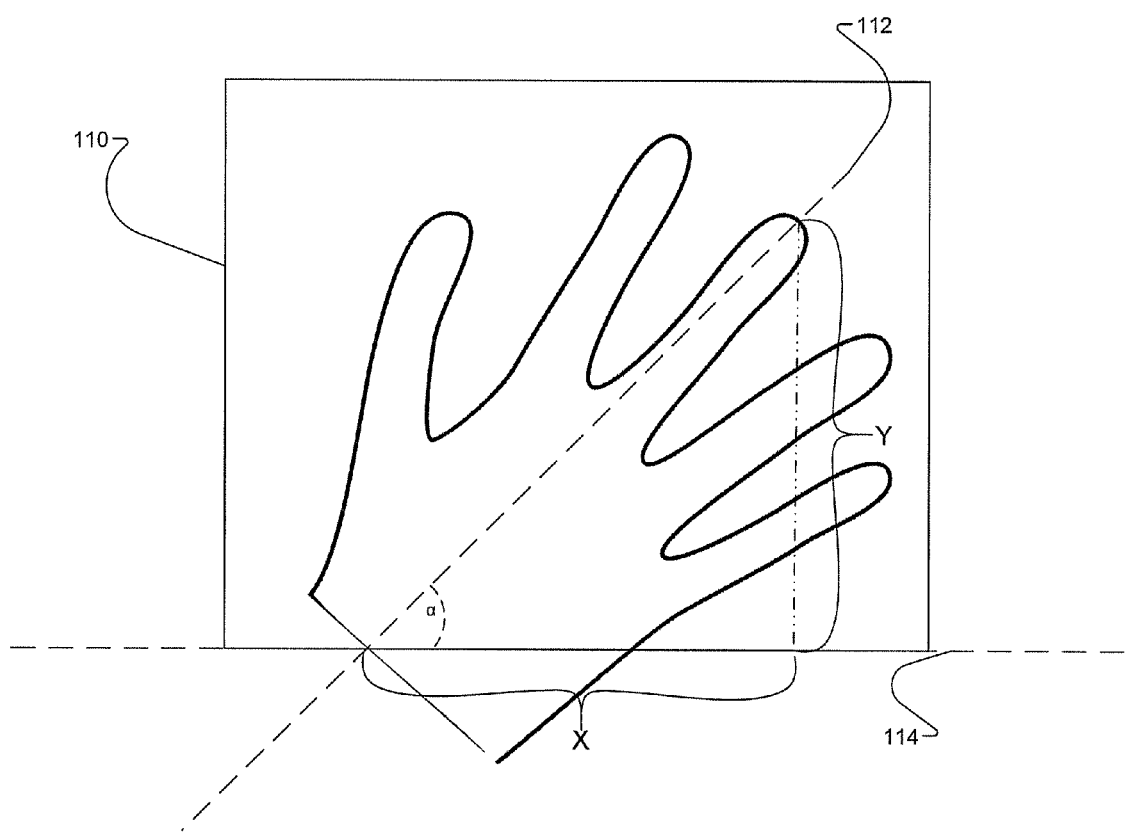
FIG. 11 illustrates an example of the rotation angle.

At step S62, signal processing module 34 estimates the rotation of the user's hand in relation to the touchpad. Signal processing module 34 may use the estimated hand position and a reference line, such as the bottom edge of the touchpad, to estimate the amount of rotation of the hands. An example of the rotation angle is provided in FIG. 11. As can be seen, an angle a may be calculated from an axis of the hand 112 and a reference line 114 at the bottom of the touchpad 110. Signal processing module 34 may calculate a rotation angle by calculating the angle between the imaginary line 112 going through the center axis of the hand, e.g. from the center of the palm blob to the center of one of the finger blobs, and the reference line 114. It is envisioned that various trigonometric techniques may be used to estimate the rotation angle. For example, the imaginary line going from the center of the palm blob to the center of a finger blob may be continued to the reference line. The intersection point between the imaginary line and the reference line may be referenced as point (0,0), while the center of the finger blob may be labeled as (x,y), i.e. the grid location of the center of the finger blob. It should be appreciated that the rotation angle, α, may be calculated as arctan x/y. The resulting angle, α, indicates an estimate of the rotation of the user's hand from the reference line. It should be appreciated that other trigonometric functions may be used to calculate the rotation angle α. Furthermore, the rotation angle may be taken from various reference lines, not just the bottom edge of the touchpad.

At step S64, signal processing module 34 estimates a user's hand size. The hand size can be estimated by calculating the distance from the a point on the hand blob and a point of one of the finger blobs. For example, signal processing module 34 can iteratively calculate the distances between the points on the peripheral edge of the palm blob and the peripheral edges of the finger blobs and determine the max distance. The hand size can then be estimated from the calculated distance. For example, the hand size estimate may be calculated using anatomical ratios of hand size to finger size. Alternatively, the estimated hand size may be defined as the calculated distance, indicating a length from the tip of the middle finger blob to the bottom of the palm blob.

At step S66, the data extracted from the touch sensor signal are used to determine or retrieve a corresponding hand model. Hand models are numerical representations of various hand shapes. The hand models also include active zones and passive zones. The active zones indicate areas proximate to contact points where touch sensor signals are considered intentional. The passive zones indicate areas proximate to contact points where touch sensor signals are considered unintentional or inadvertent. In alternative embodiments, the active zones and passive zones may be calculated once a hand model is determined or retrieved.

Figure 7A:
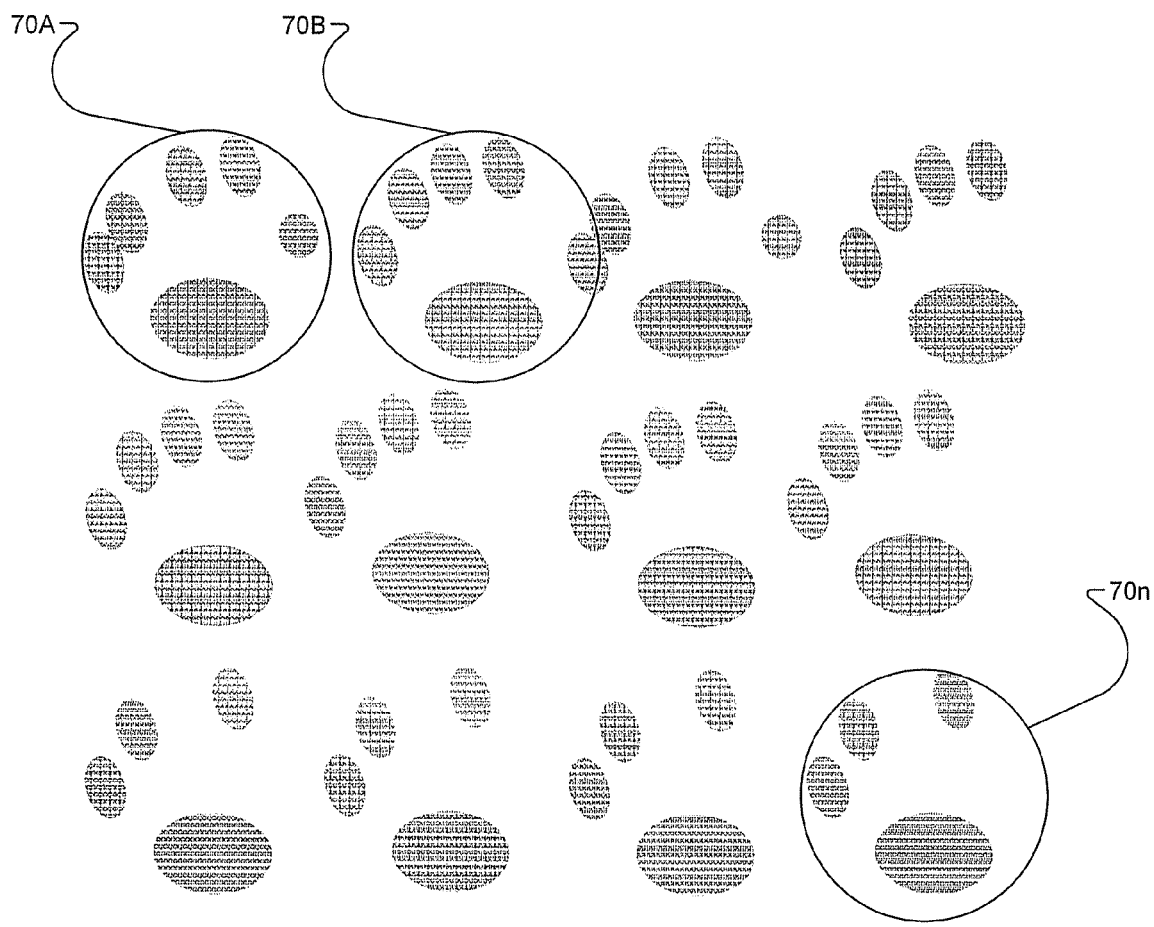
FIG. 7A illustrates a plurality of exemplary hand models.

The hand models may be stored in a hand model database. The hand models represent various configurations of blobs. FIG. 7A illustrates 12 exemplary depictions of hand models. For example, hand model 70A has been circled. It should be appreciated that these images represent the graphically rendered representations of the numerical models stored in the hand model database. In some embodiments, the various blobs indicating the points of contact between the user's hand and the touch surface may be normalized to a predetermined hand size using the estimated hand size. Essentially, using the user's estimated hand size and the predetermined hand size, the various blobs may be resized according to the ratio of the predetermined hand size to the user's hand size. Normalizing the blobs may be useful to reduce the sparsity of the data sets. Furthermore, if generic hand models, i.e. preloaded hand models provided by the manufacturer or a third party, are used, users having different sized hands but similar hand shapes and patterns can match to the same hand model. Alternatively, in the case of user-trained hand models, i.e. the hand models represent the hand patterns of actual users of the device, it is envisioned that the user hand pattern may or may not be normalized when matching to user-trained hand models.

Techniques such as clustering may be used for performing the pattern matching of the user's hand pattern with the hand models. An alternative method of performing the pattern matching is by solving $(k, x, y, \alpha) = \arg\min \|C(x,y) - M_{k,\alpha}(x,y)\|$, wherein $C(x,y)$ is the raw capacitance at a point $(x,y)$ and $M_{k,\alpha}(x,y)$ is a quantized model k rotated by α. It is envisioned that other methods of performing pattern matching or determining a hand model may be used. In some embodiments, the pattern matching may produce the n-closest matches. In these embodiments, a regression may be run on the set of n-hand models. The regression techniques may be range from averaging the set of hand models to performing a linear regression on the set of hand models. In these embodiments, the result of the regression may be used as the hand pattern.

Referring back to FIG. 4, after determining a matching hand model, signal processing module 34 will determine the active zones and the passive zones based on the hand model at step S46. An active zone corresponds to a portion of the touchpad where signal processing module 34 assumes that a user's touches or motions are intended. A passive zone corresponds to a portion of the touchpad where signal processing module 34 assumes that a user's touches or motions are unintended, or incidental to use of the device. Typically, most areas proximate to the palm and possibly the thumb are classified as passive zones, whereas the areas proximate to the fingers are active zones. As mentioned earlier, the active zones and passive zones may be hard coded into the hand models. Alternatively, the active zones and passive zones may be calculated in real time based on the contact points. For example, an active zone may be the area extending one inch in all directions from each finger, where the passive zones may be the areas extending half an inch in all directions from the palm and thumb.

Figure 7B:
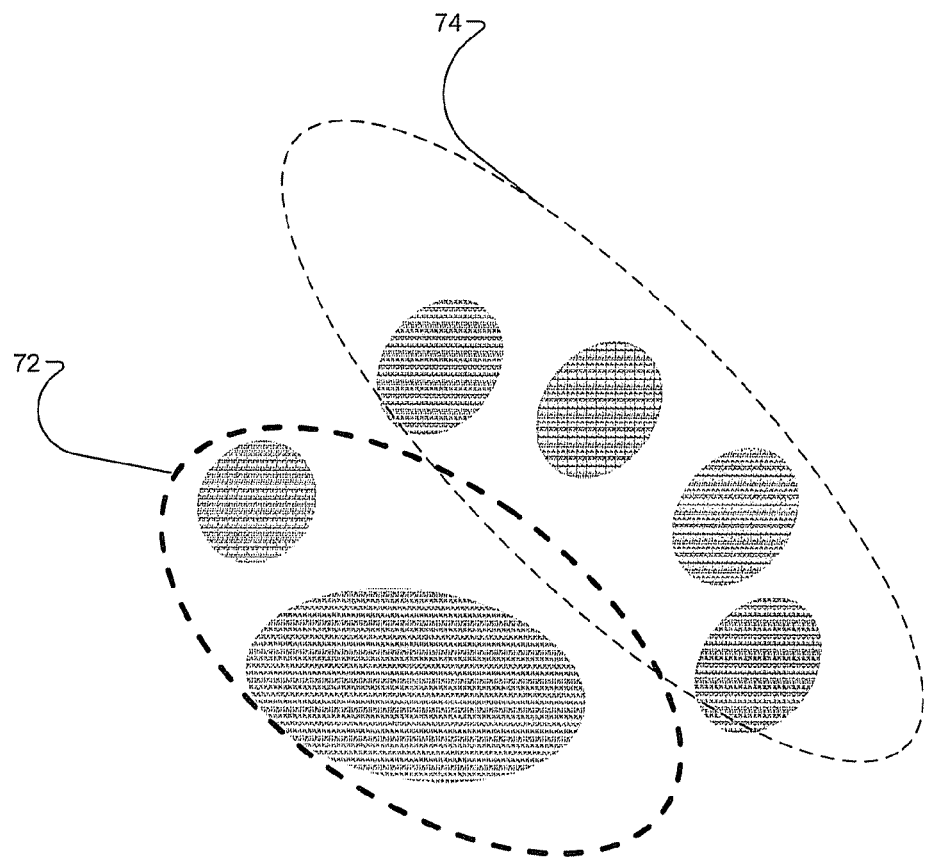
FIG. 7B illustrates a plurality of exemplary hand models with defined active and passive zones.
Figure 8:
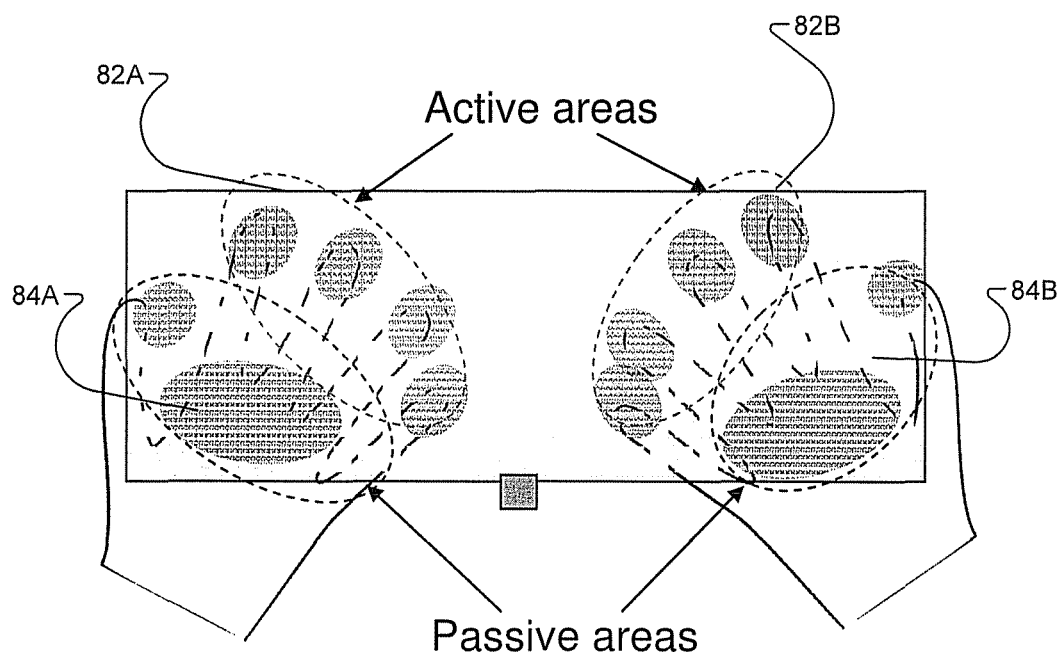
FIG. 8 illustrates active and passive zones when applied to a touch sensitive surface.

The active zones and passive zones may be associated with the determined or retrieved hand model. For example, in FIG. 7B, a hand model is depicted having one active zone 72 and one passive zone 74. It is envisioned that each hand model may have multiple active zones and multiple passive zones, however. These zones may be preloaded or may be learned over the course of user training sessions. The signal processing module 34 will use the stored hand models, the hand size, and the rotation angle of the hand to determine the physical location of the active zones and the passive zones on the touchpad. For example, FIG. 8, shows two hands on a touchpad. Signal processing module 34 has identified the matching hand model and the corresponding active zones 82A and 82B and passive zones 84A and 84B. As can be seen in zones 82A and 82B, touch sensor signals will be initially considered active input because the signals are received from an active zone. Signals received from zones 84A and 84B will be considered passive input and should not be considered input for controlling the user interface.

Once the active and passive zones are identified, input signals resulting from a global shift or involuntary movement of the hand may be filtered out. A global shift may be defined as a shift of the hand with respect to the touchpad. For example, if the device slips out of a user's hand, the sensors on the touchpad may incorrectly calculate an input signal corresponding to the total distance the device (or touchpad) moved with respect to the hand. In reality, however, it was the touchpad that moved and not the user's hand. Or in another example, the user may move his or her hand with respect to the touchpad. The user did not intend on entering input, but rather was merely moving his or her hand. It should be apparent that calculating a global shift will compensate for such actions.

Figure 9:
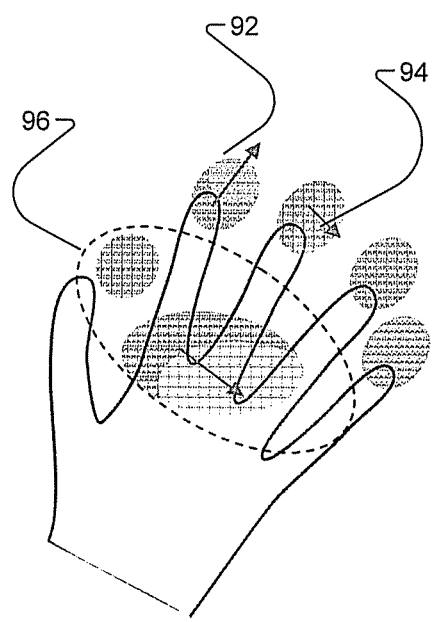
FIG. 9 illustrates an example of a global shift.

To determine the amount of a global shift, the movement of the palm with respect to the touchpad may be indicative of a global shift. As can be seen in FIG. 9, the blobs in the passive zone 90 moved down and to the right, as did the middle finger blob 94. The pointer finger blob 92 moved up and to the right. Thus, it may be advantageous, for purposes of controlling the user interface, to compensate actual intended motions by the amount of global shift.

Figure 10:
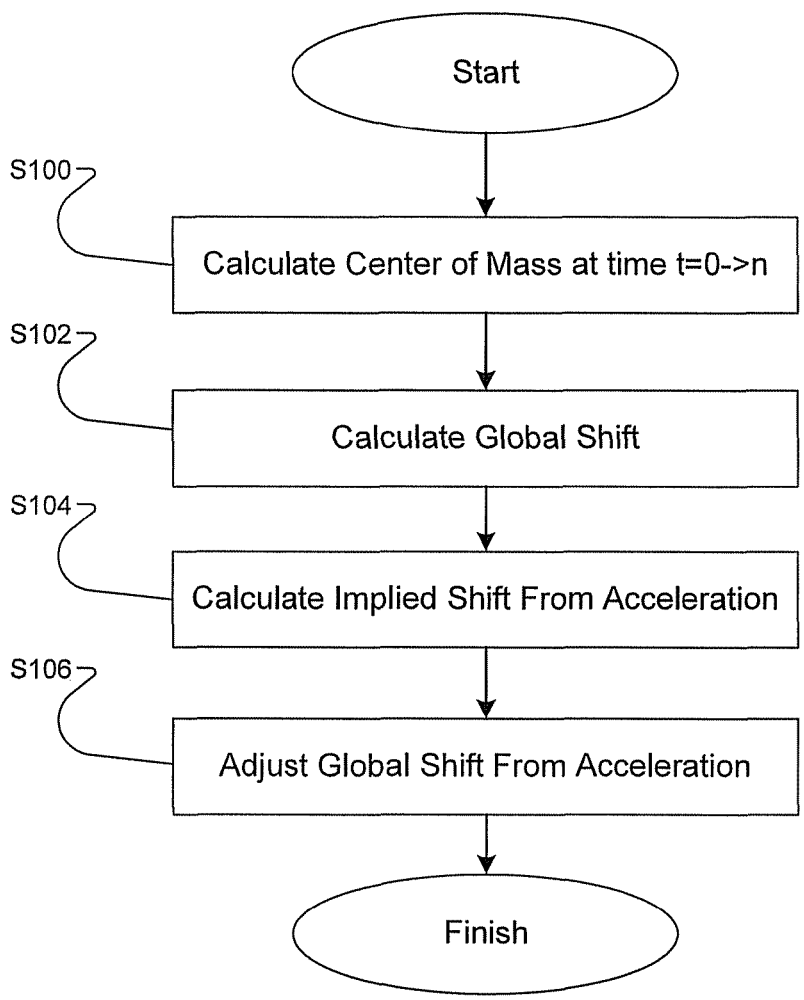
FIG. 10 illustrates a flow diagram of an exemplary method to calculate a global shift.

Signal processing module 34 can calculate global shift in various ways. FIG. 10 depicts an exemplary method for calculating a global shift. The exemplary steps include a step S100 of calculating a center of mass of the blobs at time t=0 to n, a step S102 of calculating the global shift, a step S104 of calculating an implied shift due to acceleration of the device, and a step S106 of adjusting the global shift for the acceleration.

At step S100, signal processing module 34 calculates the center of mass of the blobs at time t. The center of mass denotes the average of the sensed points of contact weighted by the capacitance at the points of contact. It should be apparent that as a user's hand moves along the touchpad, the center of mass may also move. Thus, the center of mass may be calculated at various times t. The center of mass can be calculated by the following equation:

$$P_t = \frac{\sum_v C_t(v)v}{\sum_v C_t(v)}$$

Where $v=(x,y)$, and $C_t$ is the capacitance at time t.

At step S102, the global shift from time $t-1 \rightarrow t$ is iteratively calculated. The global shift can be calculated by calculating the shift, $S_t$, in the center of mass by:

$$S_t = P_t - P_{t-1}$$

In some embodiments of mobile devices, an accelerometer may be inserted in the device. The accelerometer can indicate any global movements of the device. In the event the data from the accelerometer correlates to the global shift, signal processing module 34 may assume that the device moved and any signals corresponding to the accelerometer data were inadvertent and unintended. Thus, at step S104, an implied shift, $I_t$, may be calculated by calculating a regression of the accelerations. The implied shift may be calculated by the following:

$$I_t = R(\alpha_t, \alpha_{t-1}, \alpha_{t-2} \ldots \alpha_{t-n})$$

It is envisioned that any type of regression may be used. Finally at step S106, the global shift may be adjusted for acceleration. At each time t, the global shift may be adjusted as follows:

$$Q_t = S_t - I_t$$

Once signal processing module 34 has calculated the global shift, the signals received from the active zones may be compensated for the global shift. Thus, vectors representing the sensed finger motions in the active zones may have the calculated value, $Q_t$, removed from each element, thereby adjusting the received touch sensor signals according to the global shift.

An example of global shift is herein provided. A user may have four fingers and his palm on the touchpad. Suppose the center of mass is calculated to be at the center of the palm blob. The center of mass is then measured to have moved two units to the right and three units down. Thus, the global shift may be characterized by the vector $$\begin{bmatrix} 2 \\ -3 \end{bmatrix}.$$

Suppose that the middle finger, the ring finger and the pinky finger all have the same motion vector associated therewith. Finally, suppose that the user's index finger actually moves up one unit and to the left one unit so that the motion vector with respect to the touchpad is $$\begin{bmatrix} -1 \\ 1 \end{bmatrix}.$$

After correcting the motion of the index finger by removing the global shift, the resulting motion vector for the index finger will be $$\begin{bmatrix} -3 \\ 4 \end{bmatrix}.$$

Thus, the input associated with the index finger will be 3 units to the left and four units up. The remaining fingers will have the vector $$\begin{bmatrix} 0 \\ 0 \end{bmatrix}$$

associated with them, indicating no input.

It is noted that in the tabletop device, the device is unlikely to be mobile. Thus, steps S104 and S106 may be unnecessary, and I can be ignored or set to 0. Furthermore, in touchpads that accommodate two hands, the global shift may be calculated for both hands individually.

Once the active zone touch signals have been adjusted according to the global shift, signal processing module 34 may compare the adjusted touch signals to determine if a user input was intended. One possible way is to determine if the adjusted touch signal corresponds to a finger movement greater than a predetermined threshold. If the finger movement exceeds the predetermined threshold then the adjusted signal is used as input to control the user interface. If it is not greater than the predetermined threshold, then the signal may be ignored. Once signal processing module 34 has determined that the user has entered an input, the adjusted touch sensor signal may be communicated to the graphical user interface.

Referring back to the example provided above, the index finger had a motion vector of $$\begin{bmatrix} -3 \\ 4 \end{bmatrix}$$

associated with it. It can be appreciated that the net movement of the index finger is 5 units ($-3^2+4^2=5^2$). Thus, if the predetermined threshold is set to a value below 5, the net movement of the index finger will be considered user input. If the threshold was above 5, the net movement of the index finger would not be considered input.

While this disclosure has focused on using the touch sensor signal associated with the active zones, it is envisioned that data from the passive zones may also be used by the device. The back touchpad may be used to detect if a user has intended an input. For example, if the device is a telephone, the back touchpad may provide a means of determining false-key press. Often referred to as a pocket-dial, many mobile telephone users will inadvertently dial a number in a contact list accidentally from their pockets. Thus, the cell phone may be unable to dial out unless signal processing module 34 detects the user's palm on the back touch sensors.

In the context of the intelligent table top, it is envisioned that a user input device such as a virtual key board may be displayed on the surface. The method may use the palm location to determine where to display the keyboard. The keyboard may be displayed after signal processing module 34 determines that the user has placed his or her palms on the table top for a predetermined amount of time. Also, based on an unnormalized hand pattern, the keyboard may be sized to fit the user's hand. Furthermore, signal processing module 34 may ignore any input entered in by the user's palm, but may extend the active zones to the user's thumb, as the user may be accustomed to pressing the space bar key with the left or right thumb.

It is noted that in this foregoing description, signal processing module 34 was described as performing the method in its entirety. It is understood that signal processing module 34 may be comprised of a plurality of submodules performing subtasks of the method. For example, a first submodule may perform the extracting of the hand pattern, a second submodule may perform the matching of the hand pattern with the hand models, a third submodule may perform the calculation of the global shift, a fourth submodule may perform the adjustment of the touch sensor signals, or a fifth submodule may perform the controlling of the GUI based on the touch sensor signals.

As used throughout the disclosure, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Furthermore, the terms touch-sensitive surface and touchpad have been used interchangeably. Both terms denote any type of device that senses a user's touch and/or motions related thereto and generates a touch sensor signal based on the sensed touch. Also, it is understood that the term signal may be used to denote an analog signal, a digital signal, an optical signal, or any other type of signal.

In some embodiments, it is envisioned that the hand patterns may be also used to identify a user. User identification processes may include matching a user hand pattern to a database of known user hand patterns. In these systems, the hand patterns used to identify active and passive zones may be leveraged into the user identification process. If the hand pattern is used to identify the user, then it is likely beneficial to leave the hand pattern data unnormalized. Details of identifying a user by hand pattern are described in greater detail in PCT US 2009/041227.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for distinguishing intended user input from unintended user interaction with a touchpad comprising:
   receiving a touch sensor signal from the touchpad indicating points of contact between sensors of the touchpad and a user, wherein a point of contact is a location of a sensor on the touchpad that is in contact with the user;
   identifying points of contact corresponding to at least one of the user's finger and points of contact corresponding to at least one of a user's thumb and a user's palm based on the touch sensor signal and a model of a hand; and
   identifying intended user input from the touch sensor signal wherein the intended user input corresponds to a portion of the touch sensor signal originating from the points of contact corresponding to a user's finger,
   wherein the step of identifying intended user input includes (1) calculating a global shift indicating a shift of a majority of the user's hand with respect to the touchpad, (2) using a sensor to generate data indicating movement of the touchpad and (3) correlating the calculated global shift with said data indicating movement to generate a refined global shift, and then (4) using said refined global shift to filter out the effect of touch sensor signals associated with at least one of global shift and device movement.

2. The method of claim 1 further comprising determining an amount of movement of the touchpad based on a signal received from an accelerometer associated with the touchpad.

3. The method of claim 1 wherein portions of the touch sensor signal corresponding to a user's palm are used to determine the global shift.

4. The method of claim 1 wherein the locations of points of contact corresponding to at least one of the user's finger and the locations of points of contact corresponding to at least one of a user's thumb and a user's palm are identified from predetermined areas in the at least one model of the hand.

5. The method of claim 4 further comprising maintaining a hand model database storing a plurality of models of the hand, wherein a user hand pattern is extracted from the touch sensor signal and matched to one of the plurality of models of the hand.

6. The method of claim 5 further comprising determining a hand rotation angle indicating an angle of the user's hand with respect to the touchpad, wherein the rotation angle is used in part to match the user hand pattern to the one of the plurality of models of the hand.

7. The method of claim 5 further comprising determining a user hand size based on the touch sensor signal and normalizing the user hand pattern to a predetermined size, wherein the plurality of models of the hand are all of predetermined size.

8. The method of claim 1 further comprising controlling a graphical user interface using the intended touch sensor signals.

9. A method for controlling a user interface using a touchpad comprising:
   receiving a touch sensor signal from the touchpad indicating points of contact between sensors of the touchpad and a user, wherein a point of contact is a location of a sensor on the touchpad that is in contact with the user;
   estimating a user hand pattern indicating an orientation of the user's hand with respect to the touchpad based on the touch sensor signals;
   retrieving a hand model from a hand model database based on the user hand pattern, wherein the hand model indicates active spatial locations relative to the touchpad where the user's hand motions are classified as intended motions and passive spatial locations relative to the touchpad where the user's hand motions are classified as inadvertent contact;
   calculating a global shift indicating movement of a majority of the user's hand relative to the touchpad;
   using a sensor to generate data indicating movement of the touchpad;
   correlating the calculated global shift with the data indicating movement to generate a refined global shift;
   adjusting touch sensor signals corresponding to the active spatial locations while using said refined global shift to filter out the effect of touch sensor signals associated with at least one of global shift and device movement; and controlling a user interface based on adjusted touch sensor signals.

10. The method of claim 9 further comprising determining locations of contact points between the user's hand and the touchpad, wherein the locations of the contact points are used to estimate a user hand pattern.

11. The method of claim 10 further comprising determining a rotation angle of the user's hand with respect to the touchpad based on the locations of the contact points, wherein the rotation angle is used to estimate a user hand pattern.

12. The method of claim 9 further comprising estimating a user hand size based on the locations of the contact points.

13. The method of claim 12 wherein the hand pattern is normalized to a predetermined size based on the hand size and the predetermined size, wherein the normalized hand pattern is used to retrieve the hand model from the hand model database.

14. The method of claim 9 wherein the active zone is associated with points of contact between at least one of the user's fingers and the touchpad and wherein the passive zone is associated with points of contact between at least one of the user's palm and the user's thumb.

15. The method of claim 9 wherein the touchpad is an array of capacitive sensors.

16. The method of claim 15 further comprising calculating a center of mass of the hand pattern based on points of contact between the user's hand and the touchpad and the capacitance at the points of contact.

17. The method of claim 16 further comprising calculating an amount of movement of the center of mass of the hand pattern with respect to the touchpad.

18. The method of claim 9 wherein the data indicating movement is based on accelerometer data received from an accelerometer associated with the touchpad.

19. The method of claim 9 wherein the touchpad is a back touchpad located on a rear surface of a device, wherein a display of the device is on the front surface of the device.

20. The method of claim 9 wherein the touchpad controls the graphical user interface of an interactive tabletop having a display on an upward facing surface of the tabletop.

21. The method of claim 20 wherein the graphical user interface displays an input interface at a location corresponding to the passive spatial locations of the touchpad, wherein the user enters input via the user interface at locations corresponding to the active spatial locations of the touchpad.

22. A method for controlling a user interface using a touchpad comprising:

receiving touch sensor signals from a touchpad, wherein a touch sensor signal includes a plurality of contact points between a user's hand and the touchpad;

estimating a user hand pattern that indicates an orientation of the user's hand with respect to the touchpad based on the touch sensor signals;

retrieving a hand model from a hand model database based on the user hand pattern, wherein the hand model indicates active spatial locations relative to the touchpad where the user's hand motions are classified as intended motions and passive spatial locations relative to the touchpad where the user's hand motions are classified as inadvertent;

calculating a global shift indicating movement of a majority of the user's hand relative to the touchpad;

using a sensor to generate data indicating movement of the touchpad;

correlating the calculated global shift with the data indicating movement to generate a refined global shift;

using said refined global shift to filter out the effect of touch sensor signals associated with at least one of global shift and device movement; and controlling a graphical user interface based on touch sensor signals received from sensors in the active spatial locations of the touchpad.

23. The method of claim 22 wherein the touchpad is an array of capacitive sensors.

24. The method of claim 23 further comprising calculating a center of mass of the hand pattern based on points of contact between the user's hand and the touchpad and the capacitance at the points of contact.

25. The method of claim 24 further comprising calculating an amount of movement of the center of mass of the hand pattern with respect to the touchpad.

26. The method of claim 22 wherein data indicating movement is based on accelerometer data received from an accelerometer associated with the device.

27. The method of claim 22 further comprising determining locations of contact points between the user's hand and the touchpad, wherein the locations of the contact points are used to estimate a user hand pattern.

28. The method of claim 27 further comprising determining a rotation angle of the user's hand with respect to the touchpad based on the locations of the contact points, wherein the rotation angle is used to estimate a user hand pattern.

29. The method of claim 22 further comprising estimating a user hand size based on the locations of the contact points.

30. The method of claim 29 wherein the hand pattern is normalized to a predetermined size based on the hand size and the predetermined size, wherein the normalized hand pattern is used to retrieve the hand model from the hand model database.

31. A device having a graphical user interface comprising:
a front surface and a rear surface;
a display unit on the front surface of the device;
a touchpad on the rear surface of the device having sensors dispersed along an outer surface of the touchpad, wherein the sensors are sensitive to a user's touch, and wherein the touchpad generates a touch sensor signal indicating locations of points of contact between the user's hand and the touchpad;
a sensor that generates data indicating movement of the device;
a signal processing module that receives the touch sensor signal and determines a user hand pattern based on the touch sensor signal and a model of a hand, wherein a hand pattern includes points of contact of the user's fingers and points of contact of at least one of the user's palm and the user's thumb;
the signal processing module identifies intended user input from the touch sensor signal, wherein the intended user input corresponds to a portion of the touch sensor signal originating from the points of contact corresponding to a user's finger; and
the signal processing module filters out unintended user input by (1) calculating a global shift indicating movement of a majority of the user's hand relative to the touchpad; (2) correlating the calculated global shift with the data indicating movement to generate a refined global shift; and (3) using said refined global shift to filter out the effect of touch sensor signals associated with at least one of global shift and device movement.

* * * * *

UNITED STATES PATENT AND TRADEMARK OFFICE
CERTIFICATE OF CORRECTION

PATENT NO.         : 8,502,787 B2                              Page 1 of 1
APPLICATION NO.    : 12/508704
DATED              : August 6, 2013
INVENTOR(S)        : Luca Rigazio et al.

It is certified that error appears in the above-identified patent and that said Letters Patent is hereby corrected as shown below:

In item (75) of the title page, line 4, the city of residence of inventor Tiffany Yun should indicate
    -- Fremont --

Signed and Sealed this
Twenty-fifth Day of February, 2014

Michelle K. Lee
*Deputy Director of the United States Patent and Trademark Office*